United States Patent
Qi et al.

(10) Patent No.: US 10,926,245 B1
(45) Date of Patent: Feb. 23, 2021

(54) PLATINUM-CONTAINING CATALYST SYSTEMS

(71) Applicant: GM GLOBAL TECHNOLOGY OPERATIONS LLC, Detroit, MI (US)

(72) Inventors: Gongshin Qi, Troy, MI (US); Wei Li, Troy, MI (US); Se H. Oh, Troy, MI (US); Ming Yang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/547,100

(22) Filed: Aug. 21, 2019

(51) Int. Cl.
| | |
|---|---|
| *B01D 53/94* | (2006.01) |
| *B01J 23/42* | (2006.01) |
| *B01J 33/00* | (2006.01) |
| *F01N 3/10* | (2006.01) |

(52) U.S. Cl.
CPC ............ *B01J 23/42* (2013.01); *B01D 53/944* (2013.01); *B01D 53/945* (2013.01); *B01J 33/00* (2013.01); *F01N 3/101* (2013.01); *B01D 2255/1021* (2013.01)

(58) Field of Classification Search
CPC .............. B01D 53/9445; B01D 53/945; B01D 2255/102; B01D 2257/404; B01D 2257/502; B01D 2257/702; B01D 2258/012; B01J 23/40; B01J 33/00; B01J 37/0217; B01J 37/0225; B01J 37/0207; B01J 37/0242; B01J 37/08; F01N 3/101
See application file for complete search history.

(56) References Cited

U.S. PATENT DOCUMENTS

| | | | | |
|---|---|---|---|---|
| 4,331,565 | A | * | 5/1982 | Schaefer .............. B01D 53/945 423/213.5 |
| 4,367,162 | A | * | 1/1983 | Fujitani ................ B01D 53/945 423/213.5 |
| 9,649,627 | B1 | | 5/2017 | Xiao et al. |
| 9,789,469 | B2 | * | 10/2017 | Matsueda ................ B01J 23/63 |
| 9,827,562 | B2 | | 11/2017 | Qi et al. |
| 9,855,547 | B2 | | 1/2018 | Qi et al. |
| 9,901,907 | B1 | | 2/2018 | Xiao et al. |
| 10,035,133 | B2 | | 7/2018 | Yang et al. |
| 10,046,310 | B2 | | 8/2018 | Xiao et al. |

(Continued)

*Primary Examiner* — Timothy C Vanoy
(74) *Attorney, Agent, or Firm* — Harness, Dickey & Pierce, P.L.C.

(57) ABSTRACT

The present disclosure provides a method for operating a three-way catalyst system at high temperatures. The method includes passing a high-temperature exhaust stream exiting an engine over a thermally stable three-way catalyst system including a metal oxide support; two or more catalytically active metals disposed on the support; and a porous metal oxide coating disposed on one or more exposed surfaces of the support. At least one of the catalytically active metals may be platinum (Pt). The method further includes reducing an amount of the nitrogen oxides ($NO_x$), carbon monoxide (CO), and non-methane hydrocarbons (HCs) in an effluent stream exiting the thermally stable three-way catalyst system so that the effluent stream has a combined amount of nitrogen oxides ($NO_x$) and non-methane hydrocarbons (HCs) of less than or equal to about 30 mg/mile and less than or equal to about 0.5 g/mile of carbon monoxide (CO).

18 Claims, 4 Drawing Sheets

(56) References Cited

U.S. PATENT DOCUMENTS

| | | |
|---|---|---|
| 10,159,960 B2 | 12/2018 | Yang et al. |
| 2007/0153390 A1* | 7/2007 | Nakamura ........... B01J 35/0013 |
| | | 359/601 |
| 2009/0280978 A1* | 11/2009 | Nakamura ............... B01J 23/63 |
| | | 502/303 |
| 2017/0095807 A1 | 4/2017 | Xiao et al. |
| 2018/0185831 A1 | 7/2018 | Yang et al. |
| 2018/0214859 A1 | 8/2018 | Qi et al. |
| 2018/0214860 A1 | 8/2018 | Qi et al. |

* cited by examiner

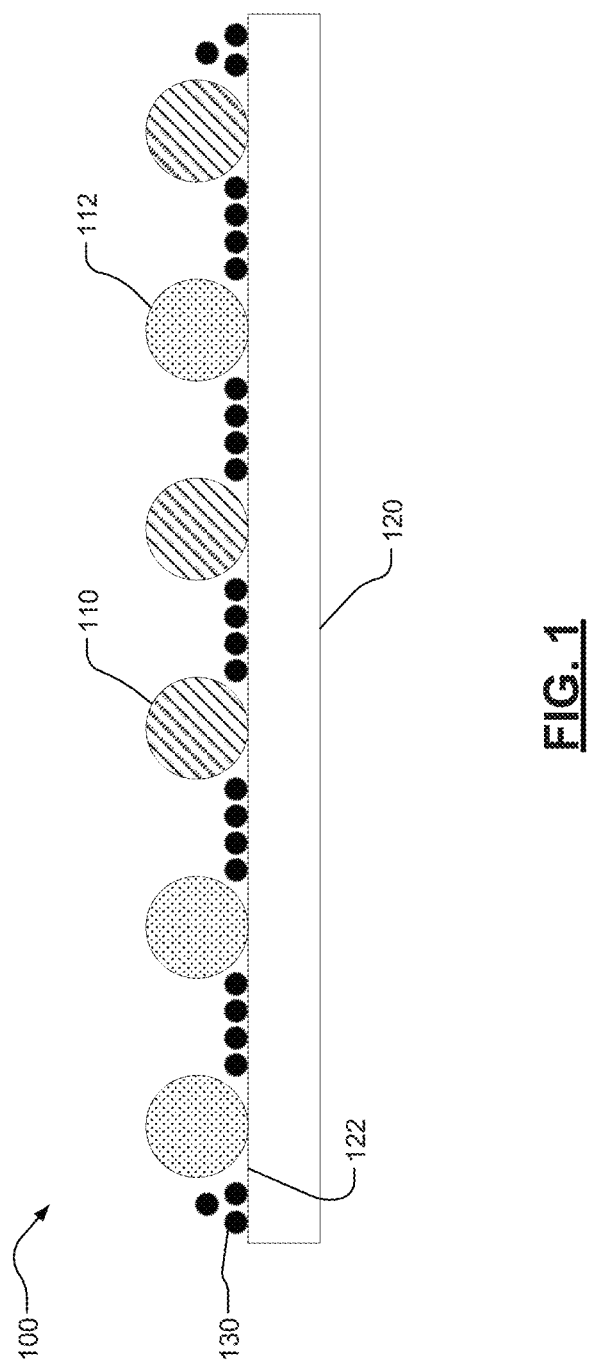

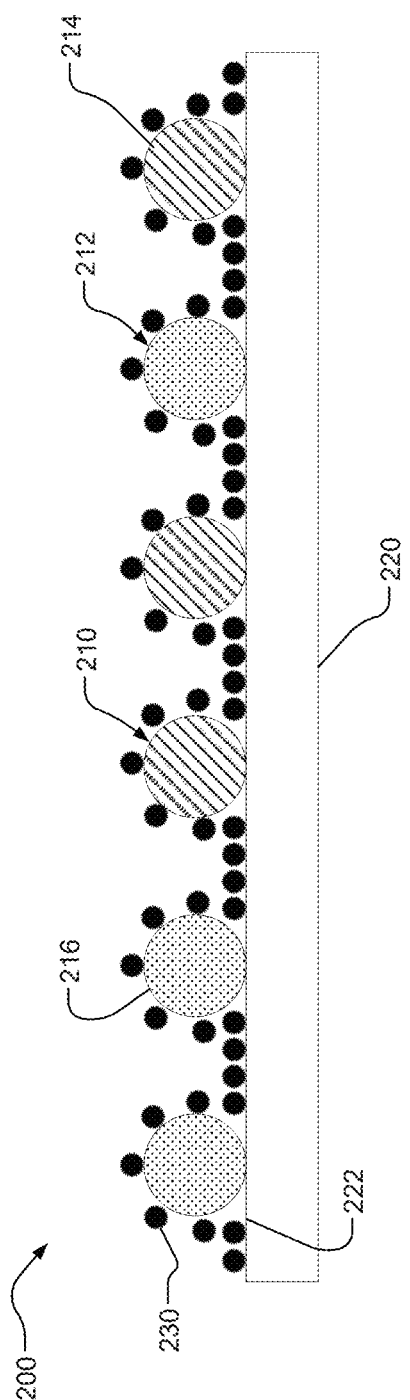

PLATINUM-CONTAINING CATALYST SYSTEMS

This section provides background information related to the present disclosure which is not necessarily prior art.

The present disclosure relates to catalyst systems that are resistant to deactivation at high temperatures and improved methods for preparing such catalyst systems.

Metal nanoparticles can make up the active sites of catalysts used in a variety of applications, such as for the production of fuels, chemicals, and pharmaceuticals, and for the emissions control from automobiles (such as three-way catalyst ("TWC") systems, for vehicles with internal combustion engines ("ICE")). Catalyst systems typically include a porous catalyst support material on which one or more catalytically active components (e.g., platinum (Pt), palladium (Pd), and rhodium (Rh)) are disposed with one or more optional promoters.

After continued use, especially at elevated temperatures, such catalyst systems including supported metal particles may lose catalytic activity due to sintering (e.g., thermally-induced catalyst deactivation that occurs at high temperatures). Through various mechanisms, sintering may result in several changes to the catalyst system. For example, catalyst metal particle size over a support can increase upon high-temperature exposure resulting in a decrease in active metal surface area available for promoting catalytic reactions. Such a particle size increase may occur via the "Ostwald ripening" mechanism, where atomic species emitted from metal nanoparticles move or diffuse across a support surface, or through a vapor phase coalescing with another nanoparticle, leading to nanoparticle growth. Deactivation can also occur as a result of structural changes in the catalyst support, where the pores of the catalyst support can collapse and potentially envelope or encapsulate catalyst particles disposed on a surface.

After sintering or deactivation processes occur, then catalyst activity may decrease. Various techniques have been employed to decrease sintering of metal nanoparticles catalysts. For example, metals have been alloyed with other metals, metal nanoparticles have been encapsulated with amorphous coating by, for example, atomic layer deposition, and strong metal nanoparticle anchoring on supports have been attempted. However, these techniques have resulted in only limited success. Accordingly, there remains a need for improved catalysts (and relating methods) that resist thermal deactivation, especially in the instance of three-way catalysts, which tend to be exposed to high temperatures (for example 1000° C. or higher) during vehicle operation.

SUMMARY

This section provides a general summary of the disclosure and is not a comprehensive disclosure of its full scope or all of its features.

In various aspects, the present disclosure provides a method for operating a three-way catalyst system at high temperatures. The method may include passing a high-temperature exhaust stream exiting a combustion engine over a thermally stable three-way catalyst system. The high temperature exhaust stream may include nitrogen oxides ($NO_x$), carbon monoxide (CO), and non-methane hydrocarbons (HCs) and may have a temperature of greater than or equal to about 600° C. The thermally stable three-way catalyst system may include a support including one or more metal oxides; two or more catalytically active metals disposed on the support; and a porous metal oxide coating disposed on one or more exposed surfaces of the support and adjacent to the two or more catalytically active metals. At least one of the two or more catalytically active metals may be platinum (Pt) and the platinum (Pt) may have a loading density on the support of greater than or equal to about 0.05% (w/w) to less than or equal to about 50% (w/w). The method may further include reducing an amount of the nitrogen oxides ($NO_x$), carbon monoxide (CO), and non-methane hydrocarbons (HCs) in an effluent stream exiting the thermally stable three-way catalyst system so that the effluent stream has a combined amount of nitrogen oxides ($NO_x$) and non-methane hydrocarbons (HCs) of less than or equal to about 30 mg/mile and less than or equal to about 0.5 g/mile of carbon monoxide (CO).

In one aspect, the temperature of the high-temperature exhaust stream may be greater than or equal to about 1,000° C.

In one aspect, the temperature of the high-temperature exhaust stream may be less than or equal to about 1,200° C.

In one aspect, the thermally stable three-way catalyst system may be an aged thermally stable three-way catalyst system. The thermally stable three-way catalyst system may be aged at greater than or equal to about 800° C. to less than or equal to about 1200° C. for greater than or equal to about 48 hours.

In one aspect, the aged thermally stable three-way catalyst system may have a light-off temperature for nitrogen oxides ($NO_x$) and non-methane hydrocarbons (HCs) of about 322° C. and a light-off temperature of carbon monoxide (CO) of about 309° C.

In one aspect, the one or more metal oxides may be selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In one aspect, the one or more metal oxides are first metal oxides and the porous metal oxide coating may include one or more second metal oxides selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In one aspect, the porous metal oxide coating may be further disposed on one or more exposed surfaces of the two or more catalytically active metals, wherein greater than or equal to about 50% to less or equal to about 95% of the two or more catalytically active metals remain exposed.

In one aspect, a remainder catalytically active metal of the two or more catalytically active metals may be selected from the group consisting of: ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof. The two or more catalytically active metals may form a first catalytically active layer on the support.

In one aspect, the first catalytically active layer may include a first portion adjacent an inlet of the high-temperature exhaust stream exiting the combustion engine and a second portion downstream of the first portion. The first portion may include a first loading density of platinum (Pt)

and the second portion may include a second loading density of platinum (Pt). The second loading density may be greater than the first loading density.

In one aspect, the thermally stable three-way catalyst system may further include a second catalytically active layer disposed on one or more exposed surfaces of the first catalytically active layer. The second catalytically active layer may include at least one catalytically active metal selected from the group consisting of: platinum (Pt), ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof.

In one aspect, the support may be a first support and the one or more metal oxides of the first support may be first metal oxides. The at least one catalytically active metal forming the second catalytically active layer may be disposed on a second support including one or more of second metal oxides. The first and second metal oxides may be independently selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In one aspect, the first and second metal oxides may include aluminum oxide ($Al_2O_3$); a remainder of catalytically active metal of the two or more catalytically active metals comprises palladium (Pd); and the at least one catalytically active metal comprises one or more of platinum (Pt), palladium (Pd), and rhodium (Rh).

In one aspect, the porous metal oxide coating may be a first porous metal oxide coating, and a second porous metal oxide coating may be disposed on one or more first exposed surfaces of the second support and on one or more second exposed surfaces of the at least one catalytically active metals. Greater than or equal to about 50% to less or equal to about 95% of the at least one catalytically active metal may remain exposed.

In various other aspects, the present disclosure provides a method of preparing a thermally-stable three-way catalyst system for use at temperatures up to about 1200° C. The method may include disposing two or more catalytically active metals on one or more exposed surfaces of a support include one or more metal oxides. At least one of the two or more catalytically active metals may be platinum (Pt). The platinum (Pt) may have a loading density on the support of greater than or equal to about 0.05% (w/w) to less than or equal to about 30% (w/w). The method may further include calcining the support including the disposed catalytically active metals by heating the support including the disposed catalytically active metals to a first temperature greater than or equal to about 200° C. to less than or equal to about 700° C. for a time greater than or equal to about 0.5 hours to less than or equal to about 10 hours to form a first calcined product. The method further include reducing the first calcined product by heating the first calcined product to a second temperature greater than or equal to about 100° C. to less than or equal to about 500° C. for a time greater than or equal to about 0.5 hours to less than or equal to about 10 hours. The method may further include disposing one or more metal oxides on one or more exposed surfaces of the support and adjacent to the two or more catalytically active metals; and calcining the support including the disposed catalytically active metals by heating the support including the disposed catalytically active metals and the one or more metal oxides to at a rate of about 1° C./minute to third temperature greater than or equal to about 200° C. to less than or equal to about 800° C. for a time greater than or equal to about 0.5 hours to less than or equal to about 10 hours to generate a porous metal oxide coating on the one or more exposed surfaces of the support and adjacent to the two or more catalytically active metals to form the thermally-stable three-way catalyst system.

In one aspect, the method may further include aging the three-way catalyst system at greater than or equal to about 800° C. to less than or equal to about 1200° C. for greater than or equal to about 48 hours.

In one aspect, disposing the one or more metal oxides on the one or more exposed surfaces of the support and adjacent to the two or more catalytically active metals may include a milling process.

In one aspect, the reducing may occur in the presence of one or more reducing gases selected from the group consisting of: hydrogen, carbon monoxide, inert gases, and combinations thereof.

In one aspect, the reducing may occur in the presence of one or more reducing liquid agents selected from the group consisting of: boron hydride salt, alcohols, formic acid, and combinations thereof.

In one aspect, a remainder of catalytically active metal of the two or more catalytically active metals may be selected from the group consisting of: ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof. The one or more metal oxides may be first metal oxides. The porous metal oxide coating may include one or more second metal oxides. The first and second metal oxides may be independently selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 1 is an exemplary and schematic illustration of a thermally-stable catalyst system in accordance with various aspects of the present disclosure;

FIG. 2 is an exemplary and schematic illustration of another thermally-stable catalyst system in accordance with various aspects of the present disclosure;

Corresponding reference numerals indicate corresponding parts throughout the several views of the drawings.

DETAILED DESCRIPTION

Figure 3A:
FIG. 3A is an exemplary and schematic illustration of a catalyst system having at least a first washcoat layer including a sinter-resistant metal-oxide coating in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned, as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides a highly active and thermally stable catalyst system (TWC) comprising a catalyst having two or more catalytically active materials disposed (for example dispersed) on a catalyst support and a metal oxide layer or coating disposed (for example dispersed) on one or more exposed surfaces of the catalyst support and/or catalytically active materials, where at least one of the two or more catalytically active materials is platinum (Pt). The present disclosure also provides methods for making and applying such catalyst systems, as well as methods of use.

In certain aspects, the highly active and thermally stable catalyst system is a three-way catalyst system that can be used in a catalytic converter of an automobile. Three-way catalyst systems typically contain at least two catalytically active materials and often three such catalytically active materials. For example, three-way catalyst systems may contain multiple platinum group metals, such as palladium (Pd), rhodium (Rh), and/or platinum (Pt). Such three-way catalyst systems may reduce or eliminate nitrogen oxides ($NO_x$), unburned hydrocarbons, and/or carbon monoxide (CO) emissions from an exhaust or effluent by promoting formation of generally inert or harmless reaction products, like carbon dioxide ($CO_2$), water ($H_2O$), and/or nitrogen ($N_2$). Catalytic removal of unreactive, saturated hydrocarbons from engine exhaust is of particular interest in meeting future emission standards, for example the SULEV30 Tier 3 Emission Standard.

Current three-way catalyst systems are close-coupled to an engine, for example for effective cold-start emission control, and are commonly subjected to higher temperatures (especially compared to diesel oxidation catalysts (DOC)). While platinum (Pt) is more active than palladium (Pd) for achieving oxidation of, for example, saturated hydrocarbons, the thermal stability of platinum (Pt) is problematic as it is not as sinter-resistant as palladium (Pd). For example, platinum (Pt) often undergoes rapid sintering and thermal deactivation when subjected to typical operating conditions of modern three-way catalyst systems.

In accordance with certain aspects of the present disclosure, the catalytically active materials are treated in a manner that stabilizes platinum-containing three-way catalysts operating under high-temperature conditions so as to provide the ability to employ platinum (Pt) in sufficient amounts suitable to achieve necessary reduction in saturated hydrocarbon emissions, among others, to meet future emission standards. For example, in various aspects, a thermally stable (e.g., sinter-resistant) three-way catalyst system may include a support; two or more catalytically active metals disposed on the support, where at least one of the two or more catalytically active metals is platinum (Pt); and a porous metal oxide coating or layer disposed on one or more exposed surfaces of the support and adjacent to the two or more catalytically active metals.

The porous metal oxide coating may physically separate the two or more catalytically active materials so that after applying metal oxide coating, the platinum (Pt) is stabilized from excessive sintering, such that partial or complete substitution of palladium (Pd) with platinum (Pt) may occur without minimizing the performance of the three-way catalyst system. In use, such platinum-containing, thermally-stable three-way catalyst systems may reduce an amount of nitrogen oxides ($NO_x$), carbon monoxide (CO), and non-methane hydrocarbons (NMHCs) so that an effluent stream exiting the thermally stable three-way catalyst system may have a combined amount of nitrogen oxides ($NO_x$) and non-methane hydrocarbons (HCs) of less than or equal to about 30 mg/miles and less than or equal to about 1 g/mile of carbon monoxide (CO), and in certain aspects, optionally less than or equal to about 0.5 g/mile of carbon monoxide (CO).

An exemplary and schematic illustration of a thermally-stable catalyst system 100, in accordance with various aspects of the present disclosure, is shown in FIG. 1. The catalyst system 100 includes a support 120 and two or more catalytically active metals 110, 112 disposed on the support 120. For example, the two or more catalytically active metals 110, 112 may occupy or cover greater than or equal to about 1% to less than or equal to about 30%, and in certain aspects, optionally greater than or equal to about 5% to less than or equal to about 25%, of a total surface area of the support 120. A porous metal oxide coating 130 may be disposed on one or more exposed surfaces 122 of the support 120 and adjacent to the two or more catalytically active metals 110, 112. For example, the porous metal oxide coating 130 may form a metal oxide-containing barrier between the two or more catalytically active metals 110, 112 so as to block vapor phase transport and/or surface diffusion of the atomic species that may be emitted from the metal nanoparticle. Such may slow or prevent particle growth or sintering so as to maintain more active sites over time, especially in the instance of higher operational temperatures. For example, the catalyst system 100 may undergo a dispersion loss of greater than or equal to a about 10%, less than or equal to about 95%, and in certain aspects, optionally less than or equal to about 90% after exposure to a temperature of about 1000° C. for a time period of about 100 hours.

In various aspects, the porous metal oxide coating 130 may coat or cover greater than or equal to about 10% to less or equal to about 90% of the exposed surfaces 122 of the support 120. In certain aspects, the support 120 may have an initial surface area of greater than or equal to about 50 m$^2$/g to less than or equal to about 250 m$^2$/g, and in certain aspects, optionally greater than or equal to about 75 m$^2$/g to less than or equal to about 125 m$^2$/g. The porous metal oxide coating 130 may comprise one or more metal oxides selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In various aspects, the support 120 may similarly comprise one or more metal oxides selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof. The skilled artisan will appreciate that in various instances porous metal oxide coating 130 and the catalyst system 100 may contain one or more of the same or different metal oxides. In certain aspects, the support 120 may further include one or more dopants selected from the group consisting of: barium (Ba), cerium (Ce), zirconium (Zr), lanthanum (La), nickel (Ni), neodymium (Nd), praseodymium (Pr), and combinations thereof.

The two or more catalytically active metals 110, 112 may be directly or indirectly bound to the catalyst support 120. At least one of the two or more catalytically active materials 110, 112—for example a first catalytically active metal 110—comprises platinum (Pt). The remainder or second catalytically active metal 112 may be selected from the group consisting of: ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof. For example, in certain aspects, the remainder nanoparticles 112 may comprise palladium (Pd) and/or rhodium (Rh). In certain aspects, a ratio of platinum (Pt) to palladium (Pd) may be greater than or equal to about 1:10; and a ratio of platinum (Pt) to rhodium (Rh) may be greater than or equal to about 10:1 to less than or equal to about 50:1. In still further aspects, the two or more catalytically active metals 110, 112 may form one or more alloys.

In various aspects, the first catalytically active metal 110 may have a loading density on the support 120 of greater than or equal to about 0.5% (w/w) to less than or equal to about 50% (w/w), and in certain aspects, optionally greater than or equal to about 1% (w/w) to less than or equal to about 30% (w/w). The second catalytically active metal 112 may have a loading density on the support 120 of greater than or equal to about 0.5% (w/w) to less than or equal to about 50% (w/w), and in certain aspects, optionally greater than or equal to about 1% (w/w) to less than or equal to about 30% (w/w), such that collectively the two or more catalytically active metal 110, 112 may have a loading density on the support 120 of greater than or equal to about 0.05% (w/w) to less than or equal to about 70% (w/w), and in certain aspects, optionally greater than or equal to about 0.5% (w/w) to less than or equal to about 30% (w/w).

In various aspects, the catalyst system 100 includes greater than or equal to about 0.5 wt. % to less than or equal to about 90 wt. %, and in certain aspects, optionally greater than or equal to about 0.5 wt. % to less than or equal to about 20 wt. %, of first catalytically active metal 110; and greater than or equal to about 0.5 wt. % to less than or equal to about 60 wt. %, optionally greater than or equal to about 10 wt. % to less than or equal to about 30 wt. %, and in certain aspects, optionally greater than or equal to about 10 wt. % to less than or equal to about 20 wt. % of the second catalytically active metal 112. Further, the catalyst system 100 may include greater than or equal to about 0.5 wt. % to less than or equal to about 50 wt. % of the support 120, and greater than or equal to about 1 wt. % to less than or equal to about 50 wt. % of the porous metal oxide coating 130.

The skilled artisan will appreciate that the support 120 may have shapes or forms other than a planar structure as shown in FIG. 1 (or FIG. 2). For example, in certain variations, the catalyst support 120 may be in the form of a plurality of particulates (e.g., powder) or beads so as to form a packed bed catalyst. For example, the catalyst support 120 may have an average diameter of greater than or equal to about 0.8 µm to less than or equal to about 5 µm, greater than or equal to about 1 µm to less than or equal to about 4 µm, greater than or equal to about 1.5 µm to less than or equal to about 3.5 µm, and in certain aspects, optionally greater than or equal to about 2 µm to less than or equal to about 3 µm.

In various aspects, the two or more catalytically active metals 110, 112 may have an initial average diameter of greater than or equal to about 0.5 nm to less than or equal to about 10 nm, and in certain aspects, optionally greater than or equal to about 3 nm to less than or equal to about 10 nm. The one or more metal oxides forming the porous metal oxide coating may have an average diameter of greater than or equal to about 50 nm to less than or equal to about 2000 nm, and in certain aspects, optionally greater than or equal to about 500 nm to less than or equal to about 1000 nm.

An exemplary and schematic illustration of another thermally-stable catalyst system 200 in accordance with various aspects of the present disclosure is shown in FIG. 2. Like the catalyst system 100 illustrated in FIG. 1, catalyst system 200 includes a support 220 and two or more catalytically active metals 210, 212 disposed on the support 220. At least one of the two or more catalytically active metal 210, 212—for example a first catalytically active metal 210—comprises platinum (Pt). The remainder or second catalytically active metal 112 may be selected from the group consisting of: ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof.

A porous metal oxide coating 230 may be disposed on one or more exposed surfaces 222 of the support 220 and on one or more exposed surfaces 214 of the first catalytically active metal 210, as well as one or more exposed surfaces 216 of the second catalytically active metal 212, such that greater than or equal to about 50% to less than or equal to about 95% of a total surface area of each of the first and second catalytically active metals 210, 212 remains exposed. In certain aspects, the porous metal oxide coating 230 may coat or cover greater than or equal to about 5% to less than or equal to about 80%, of a combined exposed surface area of the support 220 and the two or more catalytically active metals 210, 212. As such, the metal oxide coating 230 renders the catalyst system 200 resistant to sintering or thermal degradation by preventing the migration or coalescence of the two or more catalytically active metals 210, 212, especially when subjected to elevated temperatures. The support 220 and the porous metal oxide coating 230 may comprise one or more metal oxides independently selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

In various aspects, the present disclosure provides a method for preparing a catalyst system, such as the catalyst system 100 illustrated in FIG. 1 and/or the catalyst system 200 illustrated in FIG. 2. The method generally includes contacting, for example using wet or dry impregnation, a catalyst support with the two or more catalytically active metal precursors, calcining the mixture, and further reducing the calcined mixture to form the catalyst support having two or more catalytically active metals disposed or anchored thereon; and contacting the catalyst support including the two or more catalytically active materials with one or more metal oxides and calcining the combination to form a porous metal oxide coating one or more exposed surfaces of the support and/or one or more exposed surfaces of the two or more catalytically active metals.

For example, the method may include disposing two or more catalytically active metals on one or more exposed surfaces of a support. The support may comprise one or more metal oxides selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof. At least one of the two or more catalytically active metals—a first catalytically active metal—comprises platinum (Pt). For example, in various aspects, the platinum (Pt) may have a loading density on the support of greater than or equal to about 0.05% (w/w) to less than or equal to about 30% (w/w). The reminder or second catalytically active metal may be selected from the group consisting of: ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof. For example, an aqueous solution or slurry may be formed comprising greater than or equal to about 1 wt. % to less than or equal to about 20 wt. % of platinum (Pt); greater than or equal to about 1 wt. % to less than or equal to about 20 wt. % of palladium (Pd); and greater than or equal to about 60 wt. % to less than or equal to about 98 wt. % of aluminum oxide ($Al_2O_3$). The skilled artisan will appreciate, however, that in various other aspects, the catalyst support may be contacted with the first catalytically active material and, subsequently, with the one or more remainder catalytically active material; or with the one or more remainder catalytically active material and, subsequently, with the first catalytically active material.

The method may further include calcining the support and the two or more catalytically active metals, for example in air, to a (first) temperature greater than or equal to about 200° C. to less than or equal to about 700° C., optionally greater than or equal to about 300° C. to less than or equal to about 600° C., and in certain aspects, optionally about 550° C., for a time greater than or equal to about 0.5 hours to less than or equal to about 10 hours, optionally greater than or equal to about 1 hours to less than or equal to about 5 hours, and in certain aspects, optionally about 2 hours. In certain aspects, the calcined mixture may be cooled to room temperature and the catalyst support having two or more catalytically active materials disposed thereon may be collected.

In various aspects, prior to cooling to room temperature and collection of the catalyst support having the two or more catalytically active materials disposed thereon, the calcined mixture may be further reduced by heating the calcined mixture, for example in the presence of one or more reducing gases (such as hydrogen, carbon monoxide, and/or inert gases) or one or more reducing liquid agents (such as boron hydride salts, alcohols, and/or formic acid), to a (second) temperature greater than or equal to about 100° C. to less than or equal to about 500° C., optionally greater than or equal to about 150° C. to less than or equal to about 350° C., and in certain aspects, optionally about 250° C., for a time greater than or equal to about 0.5 hours to less than or equal to about 10 hours, optionally greater than or equal to about 1 hours to less than or equal to about 5 hours, and in certain aspects, optionally about 2 hours.

Forming the porous metal oxide coating includes contacting one or more metal oxides with one or more exposed surfaces of the support including the two or more catalytically active materials and/or one or more exposed surfaces of the two or more catalytically active metals disposed on the support and an optional solvent (for example an aqueous suspension), and subjecting the mixture or slurry to a (dry or wet) grinding or milling process, for example ball milling. The optional solvent may prevent undesirable agglomeration of the powders. In various aspects, a solvent may be selected from the group consisting of: water, acetic acid, alumina sol, silicon sol, and combinations thereof. The mixture may include greater than or equal to about 20 wt. % to less than or equal to about 50 wt. %, and in certain aspects, optionally greater than or equal to about 20 wt. % to less than or equal to about 40 wt. %, of a solid fraction.

The grinding or milling process continues until coated particles are obtained. The nature of the particles may depend on the drum radius, rotation speed, amount of grinding media, and/or million solvent volume and viscosity used. For example, as detailed further above, in various aspects, the catalyst support may be in the form of a plurality of particulates having an average diameter of greater than or equal to about 0.8 µm to less than or equal to about 5 µm, greater than or equal to about 1 µm to less than or equal to about 4 µm, greater than or equal to about 1.5 µm to less than or equal to about 3.5 µm, and in certain aspects, optionally greater than or equal to about 2 µm to less than or equal to about 3 µm; and the two or more catalytically active materials may have an average diameter of greater than or equal to about 0.5 nm to less than or equal to about 10 nm, and in certain aspects, optionally greater than or equal to about 3 nm to less than or equal to about 6 nm. Such particles may be achieved using a ball mill jar having a volume of about 5 L and cylindrical alumina milling media having a diameter of about 12 mm and a length of about 12 mm and milling under such conditions may continue at a low speed (e.g., 30) for a time period of about 20 hours.

After the grinding or milling, the coated particles may be filtered from the grinding or milling mixture, with or without a washing step. The coated particles may then be heated or calcined (for example in flowing air) to form the thermal-stable three-way catalyst system. For example, the coated particles may be heated at a rate of about 1° C./minute to a (third) temperature greater than or equal to about 200° C. to less than or equal to about 800° C., optionally greater than or equal to about 300° C. to less than or equal to about 600° C., and in certain aspects, optionally about 500° C. for a time greater than or equal to about 0.5 hours to less than or equal to about 10 hours, optionally greater than or equal to about 1 hour to less than or equal to about 5 hours, and in certain aspects, optionally about 2 hours, so as to form the porous metal oxide coating on the one or more exposed surfaces of the support and/or one or more exposed surfaces of the two or more catalytically active metals. In certain variations, the one or more metal oxide may coat or cover greater than or equal to about 5% to less or equal to about 90% of the exposed surfaces of the support and/or greater than or equal to about 10% to less than or equal to about 50% of a combined exposed surface area of the support and the two or more catalytically active metals, such that greater than or equal to about 50% to less than or equal to about 100% of a total surface area of each of the first and second catalytically active metals 210, 212 remains exposed. In certain aspects, the method may further include aging the three-way catalyst system after the formation of the porous metal oxide coating. Aging may include heating the catalyst at greater than or equal to about 800° C. to less than or equal to about 1200° C. for greater than or equal to about 48 hours. For example, in certain aspects, such aging may occur in flow with about 10% water vapor.

In various aspects, the thermally-stable three-way catalyst may be applied to one or more surfaces of a substrate. For example, the substrate may be a monolith substrate having a honeycomb structure and the thermally-stable three-way catalyst may be applied to interior surfaces of monolith channels. In various aspects, a monolith substrate may be coated with one or more washcoat layers including one or more metal-oxide coated catalysts and/or one or more catalysts. For example, one or more sinter-resistant metal-oxide coated catalysts may be distributed in a first washcoat slurry comprising conventional washcoat ingredients, such as one or more optional binders (such as alumina sol) and/or additives (such as cerium oxide ($CeO_2$), zirconium oxide ($ZrO_2$), barium oxide (BaO), lanthanum oxide ($La_2O_3$), and combinations thereof). The first washcoat slurry may be applied to various surfaces of the monolith substrate to form a first washcoat layer thereon that may be calcined or further treated in a typical washcoat formation process. For example, the first washcoat layer may be calcined at a (fourth) temperature greater than or equal to about 100° C.

to less than or equal to about 800° C., optionally greater than or equal to about 200° C. to less than or equal to about 600° C., and in certain aspects, optionally about 400° C. for a time greater than or equal to about 1 hours to less than or equal to about 10 hours, optionally greater than or equal to about 2 hours to less than or equal to about 5 hours, and in certain aspects, optionally about 3 hours.

The skilled artisan will appreciate that in other instances, various additional washcoat layers may also be disposed on an exposed surface of the first washcoat layer and/or on other exposed surfaces of the monolith substrate. For example, in various instances, a second washcoat layer may be disposed on an exposed surface of the first washcoat layer, including the metal-oxide coated catalyst(s). In certain variations, the second washcoat layer may also comprise one or more metal-oxide coated catalyst(s). In other variations, the second washcoat layer may comprise one or more catalysts comprising a support material on which the one or more catalytically active (e.g., platinum (Pt), ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof). In such instances, the first and second washcoat layers may be calcined concurrently or consequently.

For example, the catalyst system 300 as illustrated in FIG. 3A, a first or bottom washcoat layer 310 may be disposed on one or more exposed surfaces 322 of a substrate 320 and a second or top washcoat layer 330 may be disposed on one or more exposed surfaces 312 of the first washcoat layer 310. The substrate 320 may be a monolith substrate having a honeycomb structure. The first washcoat layer 310 may comprise one or more metal-oxide coated catalyst(s), such as the catalyst system 100 illustrated in FIG. 1 and/or the catalyst system 200 illustrated in FIG. 2. The second washcoat layer 330 may comprise one or more catalyst systems comprising a catalyst support and one or more catalytically active materials, also similar to the catalyst 100 and/or catalyst 200. For example, in certain variations, the first washcoat layer 310 may comprise a platinum (Pt) and palladium (Pd) disposed on an alumina support and coated with an alumina coating; and the second washcoat layer 330 may comprise platinum (Pt) and rhodium (Rh) disposed on an alumina support. In this fashion, the catalyst system 300 may be a trimetallic system comprising platinum (Pt), palladium (Pd), and rhodium (Rh).

Figure 3B:
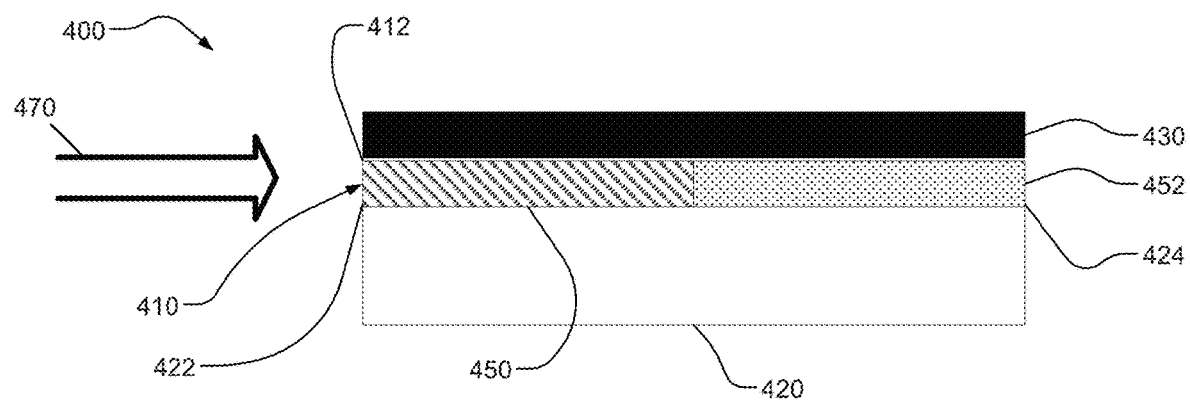
FIG. 3B is an exemplary and schematic illustration of another catalyst system having at least a first washcoat layer including a sinter-resistant metal-oxide coating in accordance with various aspects of the present disclosure.

In various other aspects, as illustrated in FIG. 3B, a catalyst system 400 also includes a first or bottom washcoat layer 410 disposed on one or more exposed surfaces 422 of a substrate 420 and a second or top washcoat layer 430 disposed on exposed surfaces 412 of the substrate of the first washcoat layer 410. The first washcoat layer 410 may include a first portion 450 and a second portion 452. The first component 450 may comprise one or more metal-oxide coated catalyst(s), such as the catalyst system 100 illustrated in FIG. 1 and/or the catalyst system 200 illustrated in FIG. 2. The second component 452 may comprises one or more metal-oxide coated catalyst(s), such as the catalyst 100 and/or catalyst 200, and/or one or more catalyst systems comprising a catalyst support and one or more catalytically active materials, similar to the catalyst 100 and/or catalyst 200, but that does not contain a metal-oxide coating.

In various instances, the first and second components 450, 452 may be disposed on the substrate 420 so as to provide location specific catalytic benefits. For example, the first portion 450 may be adjacent an inlet 470 of a high-temperature exhaust stream exiting a combustion engine. In certain aspects, the exhaust stream may have a temperature of greater than or equal to about 600° C., optionally greater than or equal to 700° C., optionally greater than or equal to 800° C., optionally greater than or equal to 900° C., optionally greater than or equal to 1000° C., and in certain aspects, optionally greater than or equal to 1100° C. The exhaust stream may have a temperature less than or equal to 1200° C. The second portion 452 may be positioned downstream of the first portion 450. In such instances, for example to improve cold start performance, the first portion may have a first platinum loading density and the second portion may have a second platinum loading density, and the second platinum loading density may be greater than the first loading density. For example, in certain aspects, the second portion may comprise only platinum (Pt).

The second washcoat layer 430 may comprise one or more metal-oxide coated catalyst(s), such as the catalyst system 100 illustrated in FIG. 1 and/or the catalyst system 200 illustrated in FIG. 2, or one or more catalyst systems comprising a catalyst support and one or more catalytically active materials, similar to the catalyst 100 and/or catalyst 200, but that omits the metal-oxide coating. The skilled artisan will appreciate in various other aspects the catalyst systems illustrated in FIGS. 3A and 3B may have shapes or forms other than a planar structure as shown.

Various aspects of the inventive technology can be further understood by specific examples contained herein. Specific non-limiting examples are provided for illustrative purposes only of how to make and/or use the compositions, devices, and methods, according to the present teachings, and, unless explicitly stated otherwise, are not intended to be a representation that given combinations have, or have not, been made or tested.

Example 1

Figure 4:
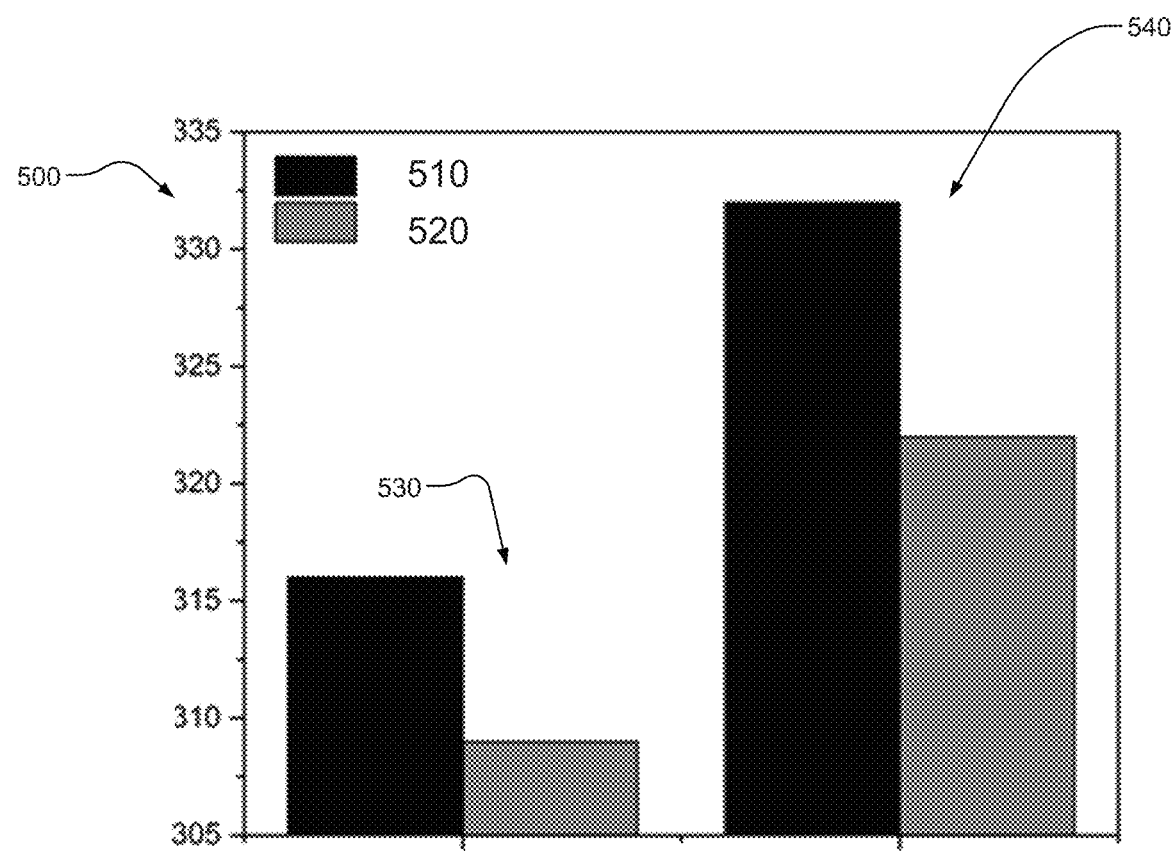
FIG. 4 is a chart illustrating light-off temperatures for comparative catalyst systems.

FIG. 4 shows light-off temperatures for comparative catalyst systems. The y-axis 500 represents light-off temperature (° C.), which is the temperature necessary to achieve 50% conversion. The first comparative catalyst system 510 comprises platinum (Pt) and palladium (Pd). The second comparative catalyst system 520 comprises platinum (Pt) and palladium (Pd) and a metal-oxide coating in accordance with various aspects of the present disclosure. In each instance, the platinum (Pt) may have a loading of about 0.75 wt. % and the palladium (Pd) may have a loading of about 0.75 wt. %. The comparative systems 510, 520 may be hydrothermally aged at 1050° C. for 48 hours.

The comparative catalyst systems 510, 520 may be contacted with an example exhaust gas comprising carbon monoxide, various hydrocarbons, nitrogen, and some residual oxygen and water. For example, the exhaust gas may comprise about 5000 ppm of the carbon monoxide, about 500 ppm of the a hydrocarbon mixture containing propylene ($C_3H_6$) and propane ($C_3H_8$), about 0.45 vol. % of oxygen, about 5 vol. % of water, and a balance of nitrogen. In the presence of the example exhaust gas, the catalyst systems 510, 520 may be heated at a rate of about 2° C. per minute to a temperature greater than or equal to about 100° C. to less than or equal to about 350° C. for a contact time of about 1,500,000 $cm^3$ $g_{cat}^{-1}h^{-1}$.

As illustrated, the second comparative catalyst system 520, prepared in accordance with various aspects of the present disclosure, has improved performance compared to the first comparative catalyst system 510. For example, in the instance of carbon monoxide, as represented by 530, the second comparative catalyst system 520 has a light-off temperature of about 309° C., while the first comparative catalyst system 510 has a light-off temperature of about 316° C. Further, in the instance of propylene ($C_3H_6$), as represented by 540, the second comparative catalyst system 520 has a light-off temperature of about 322° C., while the first comparative catalyst system 510 has a light-off temperature of about 332° C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for operating a three-way catalyst system at high temperatures, the method comprising:
   passing a high-temperature exhaust stream exiting a combustion engine over a thermally stable three-way catalyst system, wherein the high temperature exhaust stream comprises nitrogen oxides ($NO_x$), carbon monoxide (CO), and non-methane hydrocarbons (HCs) and has a temperature of greater than or equal to about 600° C., and wherein the thermally stable three-way catalyst system comprises:
      a support comprising one or more metal oxides;
      two or more catalytically active metals disposed on the support, wherein at least one of the two or more catalytically active metals is platinum (Pt) and the platinum (Pt) has a loading density on the support of greater than or equal to about 0.05% (w/w) to less than or equal to about 50% (w/w); and
      a porous metal oxide coating disposed on one or more exposed surfaces of the support and adjacent to the two or more catalytically active metals, wherein the porous metal oxide coating is further disposed on one or more exposed surfaces of the two or more catalytically active metals, and wherein greater than or equal to about 50% to less than or equal to about 95% of the two or more catalytically active metals remain exposed; and
   reducing an amount of the nitrogen oxides ($NO_x$), carbon monoxide (CO), and non-methane hydrocarbons (HCs) in an effluent stream exiting the thermally stable three-way catalyst system so that the effluent stream has a combined amount of nitrogen oxides ($NO_x$) and non-methane hydrocarbons (HCs) of less than or equal to about 30 mg/mile and less than or equal to about 0.5 g/mile of carbon monoxide (CO).

2. The method of claim 1, wherein the temperature of the high-temperature exhaust stream is greater than or equal to about 1,000° C.

3. The method of claim 1, wherein the temperature of the high-temperature exhaust stream is less than or equal to about 1,200° C.

4. The method of claim 1, wherein the thermally stable three-way catalyst system is an aged thermally stable three-way catalyst system, wherein the thermally stable three-way catalyst system is aged at greater than or equal to about 800° C. to less than or equal to about 1200° C. for greater than or equal to about 48 hours.

5. The method of claim 4, wherein the aged thermally stable three-way catalyst system has a light-off temperature for nitrogen oxides ($NO_x$) and non-methane hydrocarbons (HCs) of about 322° C. and a light-off temperature of carbon monoxide (CO) of about 309° C.

6. The method of claim 1, wherein the one or more metal oxides are selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

7. The method of claim 1, wherein the one or more metal oxides are first metal oxides and the porous metal oxide coating comprises one or more second metal oxides selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

8. The method of claim 1, wherein a remainder catalytically active metal of the two or more catalytically active metals is selected from the group consisting of: ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof; and
   wherein two or more catalytically active metals form a first catalytically active layer on the support.

9. The method of claim 8, wherein the first catalytically active layer comprises a first portion adjacent an inlet of the high-temperature exhaust stream exiting the combustion engine and a second portion downstream of the first portion, wherein the first portion comprises a first loading density of platinum (Pt) and the second portion comprises a second loading density of platinum (Pt), and wherein the second loading density is greater than the first loading density.

10. The method of claim 8, wherein the thermally stable three-way catalyst system further comprises a second catalytically active layer disposed on one or more exposed surfaces of the first catalytically active layer, wherein the second catalytically active layer comprising at least one catalytically active metal selected from the group consisting of: platinum (Pt), ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof.

11. The method of claim 10, wherein the support is a first support and the one or more metal oxides of the first support are first metal oxides; the at least one catalytically active metal forming the second catalytically active layer is disposed on a second support comprising one or more of second metal oxides; and the first and second metal oxides are independently selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

12. The method of claim 10, wherein the first and second metal oxides comprise aluminum oxide ($Al_2O_3$); a remainder of catalytically active metal of the two or more catalytically active metals comprises palladium (Pd); and the at least one catalytically active metal comprises one or more of platinum (Pt), palladium (Pd), and rhodium (Rh).

13. The method of claim 10, wherein the porous metal oxide coating is a first porous metal oxide coating, and a second porous metal oxide coating is disposed on one or more first exposed surfaces of the second support and on one or more second exposed surfaces of the at least one catalytically active metals, wherein greater than or equal to about 50% to less or equal to about 95% of the at least one catalytically active metal remains exposed.

14. A method of preparing a thermally-stable three-way catalyst system for use at temperatures up to about 1200° C., the method comprising:
   disposing two or more catalytically active metals on one or more exposed surfaces of a support comprising one or more metal oxides, wherein at least one of the two or more catalytically active metals is platinum (Pt), and wherein the platinum (Pt) has a loading density on the support of greater than or equal to about 0.05% (w/w) to less than or equal to about 30% (w/w);
   calcining the support including the disposed catalytically active metals by heating the support including the disposed catalytically active metals to a first temperature greater than or equal to about 200° C. to less than or equal to about 700° C. for a time greater than or equal to about 0.5 hours to less than or equal to about 10 hours to form a first calcined product;
   reducing the first calcined product by heating the first calcined product to a second temperature greater than or equal to about 100° C. to less than or equal to about 500° C. for a time greater than or equal to about 0.5 hours to less than or equal to about 10 hours;
   disposing one or more metal oxides on one or more exposed surfaces of the support and adjacent to the two or more catalytically active metals, wherein disposing the one or more metal oxides on the one or more exposed surfaces of the support and adjacent to the two or more catalytically active metals includes a milling process; and
   calcining the support including the disposed catalytically active metals by heating the support including the disposed catalytically active metals and the one or more metal oxides to at a rate of about 1° C./minute to third temperature greater than or equal to about 200° C. to less than or equal to about 800° C. for a time greater than or equal to about 0.5 hours to less than or equal to about 10 hours to generate a porous metal oxide coating on the one or more exposed surfaces of the support and adjacent to the two or more catalytically active metals to form the thermally-stable three-way catalyst system.

15. The method of claim 14, wherein the method further includes aging the thermally-stable three-way catalyst system at greater than or equal to about 800° C. to less than or equal to about 1200° C. for greater than or equal to about 48 hours.

16. The method of claim 14, wherein the reducing occurs in the presence of one or more reducing gases selected from the group consisting of: hydrogen, carbon monoxide, inert gases, and combinations thereof.

17. The method of claim 14, wherein the reducing occurs in the presence of one or more reducing liquid agents selected from the group consisting of: boron hydride salt, alcohols, formic acid, and combinations thereof.

18. The method of claim 14, wherein a remainder of catalytically active metal of the two or more catalytically active metals is selected from the group consisting of: ruthenium (Ru), rhodium (Rh), palladium (Pd), osmium (Os), iridium (Ir), rhenium (Re), copper (Cu), silver (Ag), gold (Au), mercury (Hg), sodium (Na), potassium (K), magnesium (Mg), calcium (Ca), barium (Ba), and combinations thereof;
   wherein the one or more metal oxides are first metal oxides,
   wherein porous metal oxide coating comprises one or more second metal oxides, and
   wherein the first and second metal oxides are independently selected from the group consisting of: cerium oxide ($CeO_2$), aluminum oxide ($Al_2O_3$), zirconium oxide ($ZrO_2$), titanium dioxide ($TiO_2$), silicon dioxide ($SiO_2$), magnesium oxide (MgO), zinc oxide (ZnO), barium oxide (BaO), potassium oxide ($K_2O$), sodium oxide ($Na_2O$), calcium oxide (CaO), lanthanum oxide ($La_2O_3$), and combinations thereof.

* * * * *